H. W. RUCH.
RAKE.
APPLICATION FILED JAN. 21, 1914.
1,113,488.
Patented Oct. 13, 1914.
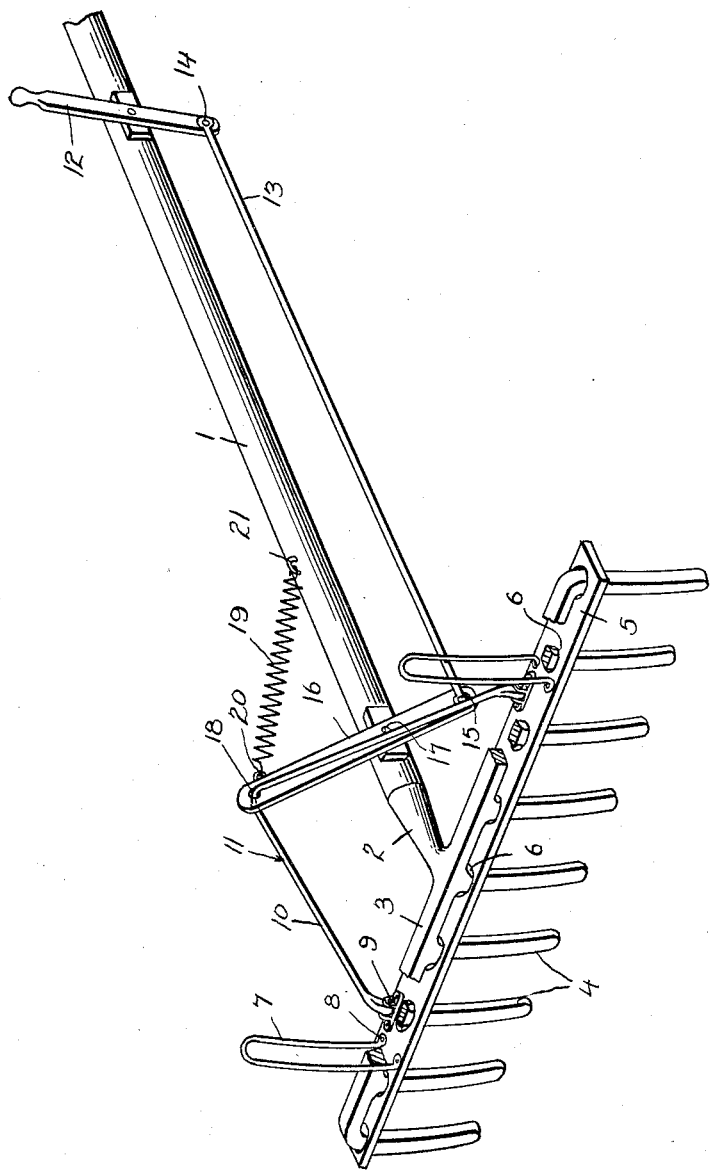
Witnesses
R. N. Jones
J. Hays Martin
Inventor
H. W. Ruch.
By A. Randolph, Jr.
Attorney

UNITED STATES PATENT OFFICE.

HARVIE W. RUCH, OF OAKLAND, CALIFORNIA.

RAKE.

1,113,488. Specification of Letters Patent. Patented Oct. 13, 1914.

Application filed January 21, 1914. Serial No. 813,424.

*To all whom it may concern:*

Be it known that I, HARVIE W. RUCH, a citizen of the United States, residing at Oakland, in the county of Alameda and State of California, have invented certain new and useful Improvements in Rakes; and I do hereby declare the following to be a full, clear, and exact description of the invention, such as will enable others skilled in the art to which it appertains to make and use the same.

This invention relates to new and useful improvements in rake cleaners, and has for its principal object to provide a simple and effective means by which the teeth of a rake may be stripped of any foreign matter or trash which may have gathered thereon.

Another object of the invention is to provide a stripping device which will automatically return to its raised position and leave the teeth in condition for use.

Still another object of the invention is the provision of a novel combination and arrangement of parts by means of which the above results may be attained, which will be particularly simple in operation, easy to manufacture and cheap in construction.

With the above and other objects in view, the invention consists in the novel combination and arrangement of parts as will be shown and described in the following specification and accompanying drawings, in which the figure illustrates a detail perspective view of a rake constructed in accordance with his invention.

Referring now to the drawings by characters of reference, the numeral 1 designates the rake handle having secured at one end thereof a suitable tapering ferrule 2 having formed integral therewith at its reduced end the rake head 3 which is provided at spaced intervals with the downwardly extending teeth 4. A suitable bar 5 having formed therein a plurality of spaced apertures 6 which are adapted to receive the rake teeth, is slidably mounted on said rake teeth as will be clearly seen on referring to the drawing. Secured to the bar 5 near each end is preferably provided the U-shaped member 7 which is riveted or otherwise secured as at 8, and is adapted to straddle the rake head 3 as clearly shown. Immediately adjacent the U-shaped member and intermediate said U-shaped member and the handle, is preferably provided the pivotal connection 9, to which the arms 10 of the V-shaped member 11 are pivotally secured.

Pivotally connected to the rake handle near the end opposite the head is preferably provided the lever 12, which has connected to one end thereof, the bar 13 as at 14. This bar 13 extends forwardly and is pivoted as at 15 to a lever 16 which is pivotally mounted as shown at 17 to the rake handle. The end of the lever 16 opposite the pivot 15 is provided with an aperture 18 through which the bight portion of the V-shaped member extends. A suitable retractile coil spring 19 is connected to the end of the lever having the aperture 18 formed therein, as at 20 and also is connected to the handle by a suitable screw eye or similar connection as at 21 and is adapted to exert pull against the lever 16 and normally hold the stripping bar 5 in its upward position which is illustrated in the drawings.

It will be apparent from the foregoing that the pull exerted by the spring 19 against the lever 16 will tend to exert upward pull on the V-shaped member which is connected to the stripping bar, and thus yieldably hold the stripping bar against the rake head and leave the rake teeth free for use. When it is desired to strip the teeth of any trash which may have gathered thereon, the only operative necessary is to push the lever 12 forward which will transmit power through the bar 13 to the lever 16 and force the stripping bar 5 toward the end of the rake teeth, thus stripping the teeth of any trash leaving the same free for use.

While in the foregoing there has been shown and described the preferred embodiment of this invention, it is to be understood that such changes may be made as will fall within the scope and spirit of the invention as claimed.

Having thus described my invention, I claim:

The combination with a rake comprising a handle, a head and teeth, of a stripping bar having a plurality of apertures formed therein, slidably mounted on the teeth, U-shaped guide members secured to the stripping bars near each end, straddling the rake head, a V-shaped member, means pivotally secured at the free ends of the arms of the V-shaped member to the stripping bar, an operating lever secured to the handle of the rake near the end opposite the head, a bar pivotally connected to one end of the operating lever, a lever pivotally secured to the end of the rake handle near the head, the free end of the last mentioned bar being pivotally secured to the second mentioned lever, the end of the second mentioned lever opposite the pivotally connected bar being provided with an aperture for the reception of the bight portion of the V-shaped member, and a spring to normally hold the apertured end of the second mentioned lever in its raised position and thereby hold the stripping bar against the rake head.

In testimony whereof I affix my signature in presence of two witnesses.

HARVIE W. RUCH.

Witnesses:
 LOWELL M. BROWN,
 MABEL RAPKEN.

Copies of this patent may be obtained for five cents each, by addressing the "Commissioner of Patents, Washington, D. C."